(12) United States Patent
Mitchell

(10) Patent No.: US 7,865,132 B2
(45) Date of Patent: Jan. 4, 2011

(54) METHOD AND APPARATUS FOR INTERACTING WITH A COMMUNICATIONS SYSTEM USING RADIATED POWER ADJUSTED ACCORDING TO AN ESTIMATION OF LINK-LOSS

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 965 days.

(21) Appl. No.: 10/894,819

(22) Filed: Jul. 20, 2004

(65) Prior Publication Data

US 2006/0030350 A1    Feb. 9, 2006

(51) Int. Cl.
  *H04K 3/00*    (2006.01)
(52) U.S. Cl. .................. 455/1; 455/440; 455/456.1; 455/522
(58) Field of Classification Search .............. 455/522, 455/456.1, 441, 437, 440, 1, 69
  See application file for complete search history.

(56) References Cited

U.S. PATENT DOCUMENTS

| | | | |
|---|---|---|---|
| 6,490,460 B1 * | 12/2002 | Soliman | 455/522 |
| 6,680,912 B1 * | 1/2004 | Kalman et al. | 370/238 |
| 6,845,246 B1 * | 1/2005 | Steer | 455/522 |
| 7,010,320 B2 * | 3/2006 | Komatsu | 455/522 |
| 7,016,691 B2 * | 3/2006 | Yaguchi et al. | 455/456.1 |
| 7,307,959 B2 * | 12/2007 | Wang | 370/252 |
| 7,355,993 B2 * | 4/2008 | Adkins et al. | 370/318 |
| 7,373,105 B2 * | 5/2008 | Dybdal et al. | 455/13.4 |
| 2002/0137538 A1 * | 9/2002 | Chen et al. | 455/550 |
| 2004/0097234 A1 * | 5/2004 | Rajkotia et al. | 455/442 |

* cited by examiner

*Primary Examiner*—Tuan H Nguyen
(74) *Attorney, Agent, or Firm*—Matthew J. Evans; Daniel M. Barbieri

(57) ABSTRACT

A method and apparatus for interacting with a communications system. Interaction with the communications system occurs by identifying an access point. An estimate of link-loss from a mobile node to the access point is then determined. Also determined is an allowable power density limit proximate to the access point. A communications signal that is suitable for interacting with the communications system is generated. The level of the communications signal is adjusted according to the estimated link-loss and also according to the allowable power density limit. The level adjusted signal is then directed to the access point.

24 Claims, 13 Drawing Sheets

METHOD AND APPARATUS FOR INTERACTING WITH A COMMUNICATIONS SYSTEM USING RADIATED POWER ADJUSTED ACCORDING TO AN ESTIMATION OF LINK-LOSS

BACKGROUND

There are many types of mobile nodes that need to communicate with a fixed-station communications system. One example of a mobile node is a cellular telephone. Typically, a cellular telephone is in constant communications with an access point. An access point is one of one or more base stations that enable a mobile node to interact with a communications system. Another example of a mobile node is a wireless networking node. A wireless networking node can include, but is not necessarily limited to an 802.11a networking node. These are but examples of the types of mobile nodes that typically need to interact with a communications system through an access point.

In a typical cellular communications system, a mobile node is limited in the amount of power that is able to radiate. By limiting the radiated power of a mobile node, it is fairly easy to ascertain when a particular mobile node is physically within a particular cell in the cellular system. As the mobile node migrates from one cell to the next, a base-station in one cell loses contact with the mobile node as a base-station in an adjacent cell establishes contact with the mobile node. As simplistic as this model may seem, it is quite effective and it is enabled by limiting the radiated power of the mobile node. If the radiated power of the mobile node were not limited in this manner, the base stations in two adjacent nodes could actually be confused with respect to which of those base stations is responsible for maintaining communications with the mobile node.

It should be appreciated that the simplistic model just described is not really how modern cellular communications systems work. Although the radiated power of a mobile node is limited, it is typically limited in order to prevent communications with a corresponding cell in a cellular matrix. A corresponding cell in a cellular matrix is typically thought of as a cell that has an identical set of adjacent cell types. For example, a mobile node is typically required to communicate with an adjacent cell before the adjacent cell acquires cognizance over the mobile node. Accordingly, the power limitation of a mobile node must not be so grave that this adjacent cell communication is precluded. A cell that is just beyond the most adjacent cell is typically considered to be a corresponding cell. It is the unwanted communications from the mobile node to this corresponding cell that is typically precluded by limiting the amount of power the mobile node is allowed to radiate.

It can be appreciated that the power that a particular mobile node is allowed to radiate must be governed by the topology of a cellular matrix and by other factors, e.g. a power limitation established by a regulatory agency. In a rural area, for example, a cellular matrix may include a cell that has a much greater spatial area than normal. It can be appreciated that as the spatial size of a cell decreases, the amount of power a mobile node can radiate will be accordingly limited. As such, a larger cell (e.g. one situated in a rural area) will allow a mobile node to radiate more power. To accommodate these variations, a base station serving a cell will broadcast a maximum power indicator that a mobile node uses to determine how much power the mobile node can radiate within the cell. This limitation is then honored by the mobile node. If the mobile node were to transmit at a much greater power level, the mobile node could interfere with communications in other cells in the system.

As prevalent as cellular communications systems are, they typically have a limited coverage area. For example, a cellular telephone system is generally intended to serve mobile nodes that are on the ground. An airborne mobile node is not generally supported by a cellular telephone system. A marine user is also generally not supported by a land-based cellular telephone system. Although airborne and marine mobile nodes can be within the range of a base station serving a cell in a cellular communications system, the fact that these mobile nodes lie outside of an intended coverage region results in some interesting problems.

The first problem is that of determining the amount of power that the mobile node is allowed to radiate. The fact that the mobile node can receive a signal from a base station only means that a satisfactory downlink can be achieved. The mobile node could use a power limitation indicator received from the base station, but if the mobile node were to limit its radiated power to this level it may not be able to establish an uplink to the base station if it is too far away from cell. Arbitrarily boosting its radiated output power could be even worse. A mobile node operating outside of the intended coverage region could interfere with other mobile nodes either situated in the cell or other cells adjacent thereto. In this case, the mobile node could actually introduce a radiated power density into the cell that exceeds limitations established by a regulatory agency.

Although cellular communications systems are commonplace, the problems of interacting with such systems from outside of an intended coverage area are common with other communications systems that only have a single base station. For example, an interaction with a single base station communications system can be just as problematic when the mobile node travels beyond the coverage area. Consider one example where a repeater is situated atop a mountain. So long as the mobile node limits its output power in accordance with established limitations, effective communications can be achieved. However, arbitrarily increasing output power to achieve an uplink can result in regulatory non-compliance and interference with other users.

SUMMARY

Disclosed are a method and apparatus for interacting with a communications system. Interaction with the communications system occurs by identifying an access point. An estimate of link-loss from a mobile node to the access point is then determined. Also determined is an allowable power density limit proximate to the access point. A communications signal that is suitable for interacting with the communications system is generated. The level of the communications signal is adjusted according to the estimated link-loss and also according to the allowable power density limit. The level adjusted signal is then directed to the access point.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

It should be appreciated that a communications system is typically established to support a plethora of simultaneous users. As such, a communications system typically provides for a plurality of access points. An access point is simply a base station that enables a user to interact with the communications system. For example, a cellular communications system with typically have a separate and distinct base station for each of a plurality of localized coverage regions known as "cells". Even though the present method is applicable to a cellular communications system, the techniques and teachings of the present method are applicable to a communications system that has only one access point.

When more than one user attempts to use any type of communications system, one important aspect is the physical interaction of a mobile node with an access point. One aspect of such physical interaction is the amount of radiated power that reaches the access point. When a signal from a first mobile node reaches an access point, the level of the signal must not be exceedingly greater than that of a signal arriving at the access point from a second mobile node. In simplistic terms, each mobile node must be a good neighbor so as not to interfere with a different mobile node.

A cellular telephone system is one example of a cellular communications system. In a cellular telephone system, each cell comprises a region surrounding an access point. In the cellular telephone business, an access point is also known as a base station. In order to be a good neighbor, a cellular telephone, which is a mobile node, interacts with the base station at a prescribed power level. Typically, a cellular telephone first establishes contact with the base station using the prescribed power level. Once the contact is established, the cellular phone interacts with the base station in order to adjust the amount of power that the cellular phone needs to radiate in order to support some minimum quality of service (e.g. a minimum data rate). As such, a cellular phone adjusts its output power according to one or more feedback signals it receives from its base station.

This paradigm for adjusting power adequately supports a cellular telephone system where a mobile node is typically located within a service region supported by a base station. However, there are situations where two or more mobile nodes need to interact with an access point and the distance from one mobile node to the access point is much greater than the distance from the second mobile node to the access point. When such a situation occurs, the first mobile node can not rely on establishing contact with the access point using a prescribed power level. This is because the link-loss from the first mobile node to the access point may be so great that an effective interaction with the access point can not be accomplished.

Figure 1:
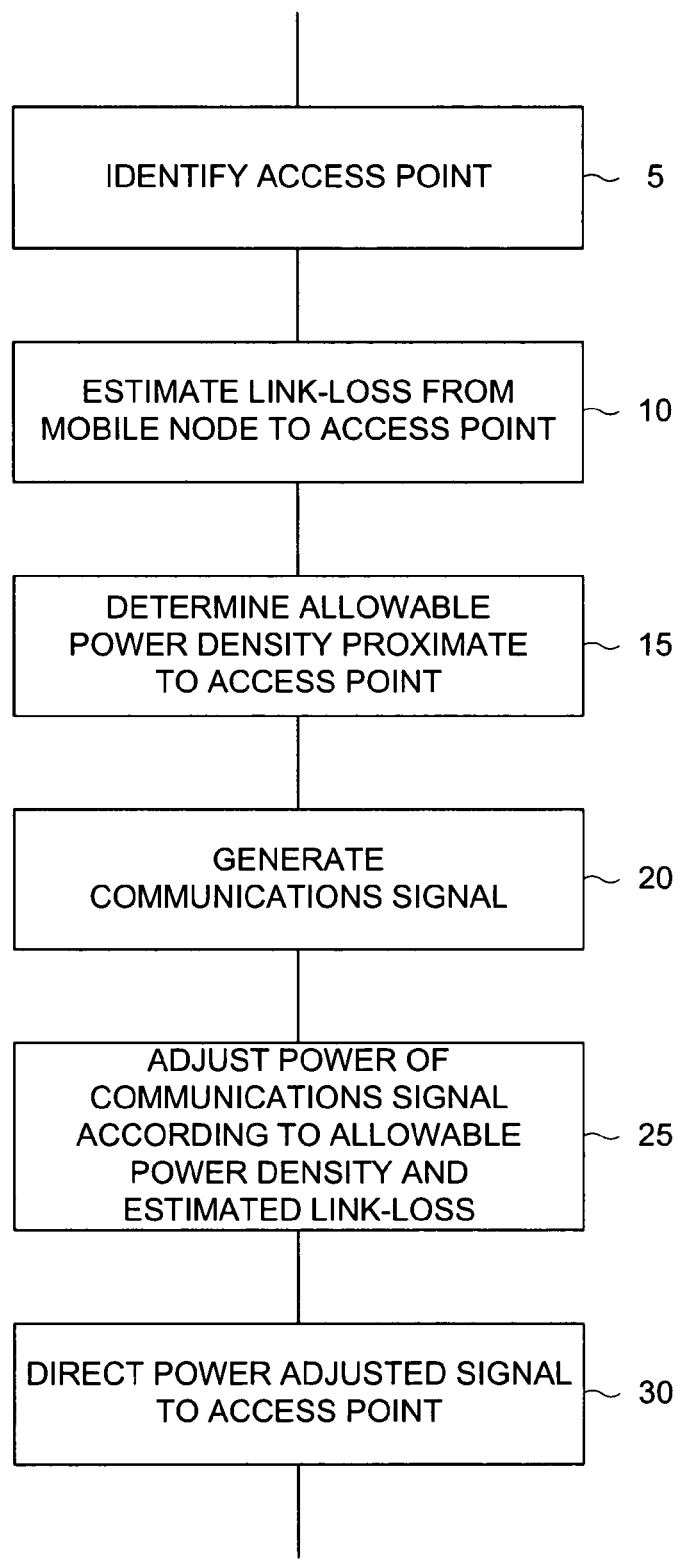
FIG. 1 is a flow diagram that depicts one example method for interacting with a communication system by first estimating link-loss.

FIG. 1 is a flow diagram that depicts one example method for interacting with communication system by first estimating link-loss. According to this example method, the first step in interacting with a communications system is to identify an access point (step 5). Once an access point is identified, the link-loss between a mobile node and the access point is estimated (step 10). In order to interact with the access point, the amount of power density that should reach the access point is determined (step 15). Typically, the amount of power density that should reach the access point is referred to as a power density limit proximate to the access point.

A communications signal suitable for interacting with the communications system is generated (step 20). This type of signal includes, according to one alternative variation of the present method, a cellular telephone signal. In yet another variation of the present method, the communications signal comprises a G3 compliant signal. In yet another variation of the present method, the communications signal generated complies with the 802.11 wireless networking standard. The power of the communications signal is adjusted according to the estimated link-loss and further adjusted according to the allowable power density limit (step 25). This, according to one illustrative variation of the present method, is accomplished by describing the link-loss as an attenuation factor, e.g. 15 dB of link-loss. According to this example variation of the method, the power density limit is expressed in terms of in dBm, which is a logarithmic representation of power relative to a milliwatt. Accordingly, the power density limit expressed in dBm is added to the link-loss in dB to determine the amount of power in dBm that needs to be directed to the access point. The power adjusted signal is then directed to the access point (step 30).

Figure 2:
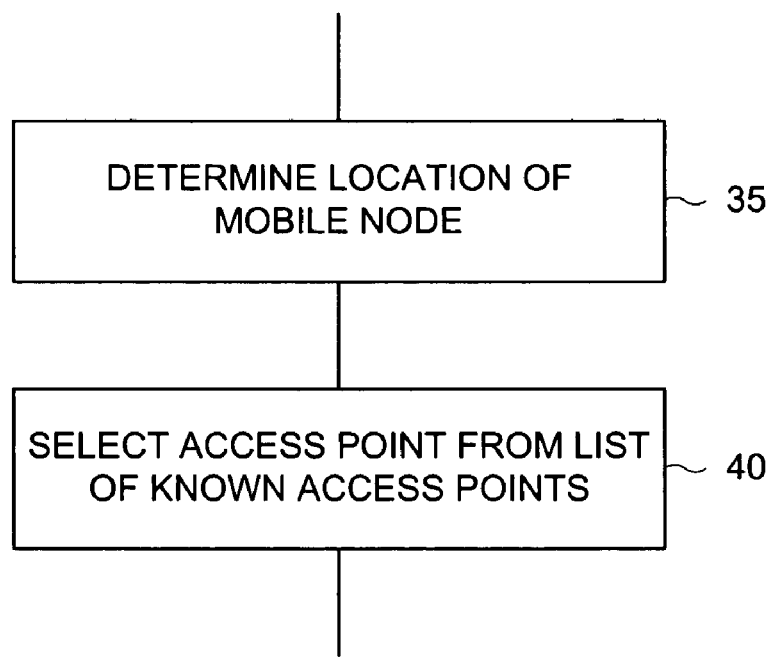
FIG. 2 is a flow diagram that depicts one alternative method for identifying an access point according to a current position of a mobile node.

FIG. 2 is a flow diagram that depicts one alternative method for identifying an access point according to a current position of a mobile node. According to this alternative method, an access point is identified by first determining the location of a mobile node (step 35). An access point is then selected from a list of known access points (step 40) according to the location of the mobile node. Based on the location of the mobile node, the most appropriate (e.g. the closest) access point is identified.

Figure 3:
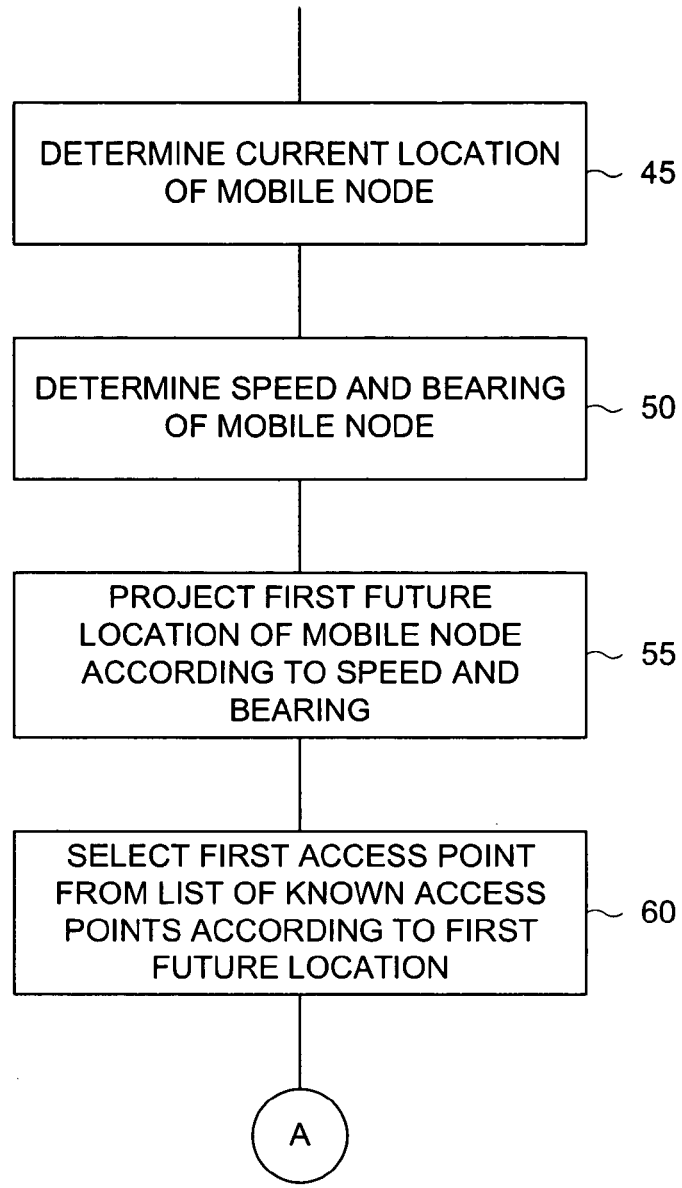
FIG. 3 is a flow diagram that depicts one example alternative method for identifying an access point according to a future position of a mobile node.

FIG. 3 is a flow diagram that depicts one example alternative method for identifying an access point according to a future position of a mobile node. According to this alternative method, an access point is selected by determining a current location of the mobile node (step 45), determining the speed and bearing of the mobile node (step 50) and then projecting a first future location of the mobile node according to the speed and bearing (step 55). The first future location of the mobile node is then used to select an access point from a list of known access points (step 60). For example, this alternative variation of the present method provides for selecting an access point before a mobile node is actually within a particular service region serviced by the selected access point. According to one illustrative use case where the present method is applied to a mobile node embodied in an aircraft, the speed and bearing of the aircraft is used to determine a future location of the aircraft as it progresses along a flight path. Accordingly, the access point is selected before the aircraft enters a service region serviced by the access point.

Figure 4:
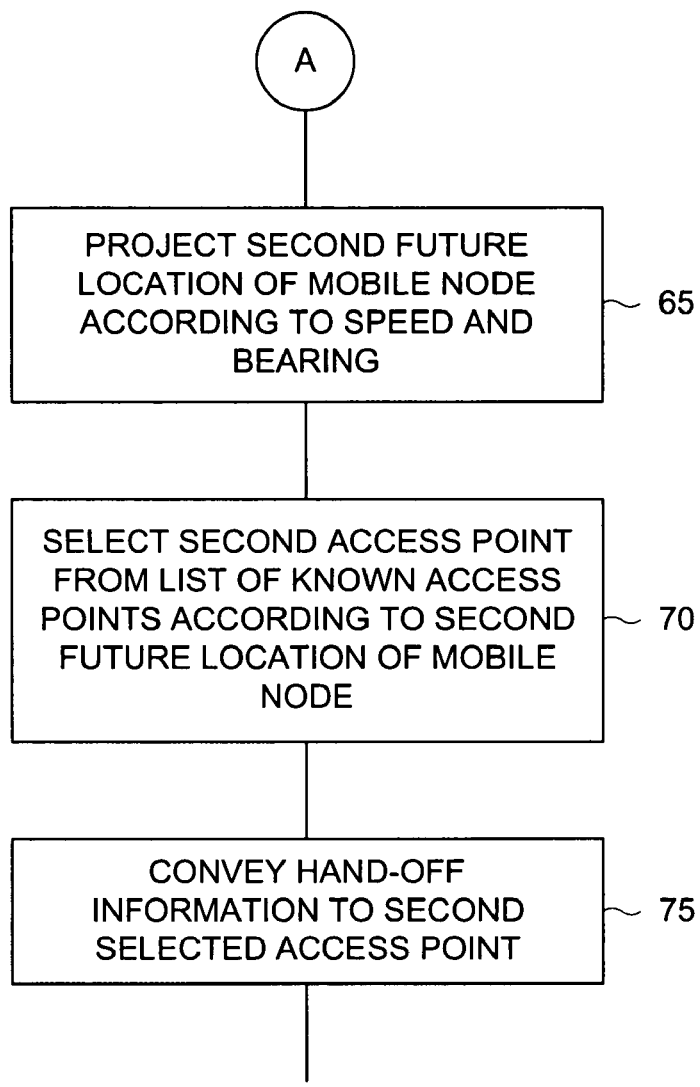
FIG. 4 is a flow diagram that depicts yet another example alternative method for identifying an access point according to a future position of a mobile node.

FIG. 4 is a flow diagram that depicts yet another example alternative method for identifying an access point according to a future position of a mobile node. In many cases where a mobile node is traveling along a projected path, it is necessary to select an access point further along the projected path in order to convey handoff information from a first access point to a second access point. Accordingly, one variation of the present method provides for projecting a second future location for the mobile node according to the speed and bearing of the mobile node (step 65). A second access point is then selected from a list of known access points according to the second future location of the mobile node (step 70). Once the second access point is selected, handoff information is conveyed thereto (step 75). By conveying the handoff information to the second access point, a much more effective transition can be achieved as the mobile node migrates from a first cellular region to a second cellular region serviced by the first and second selected access points, respectively.

Figure 5:
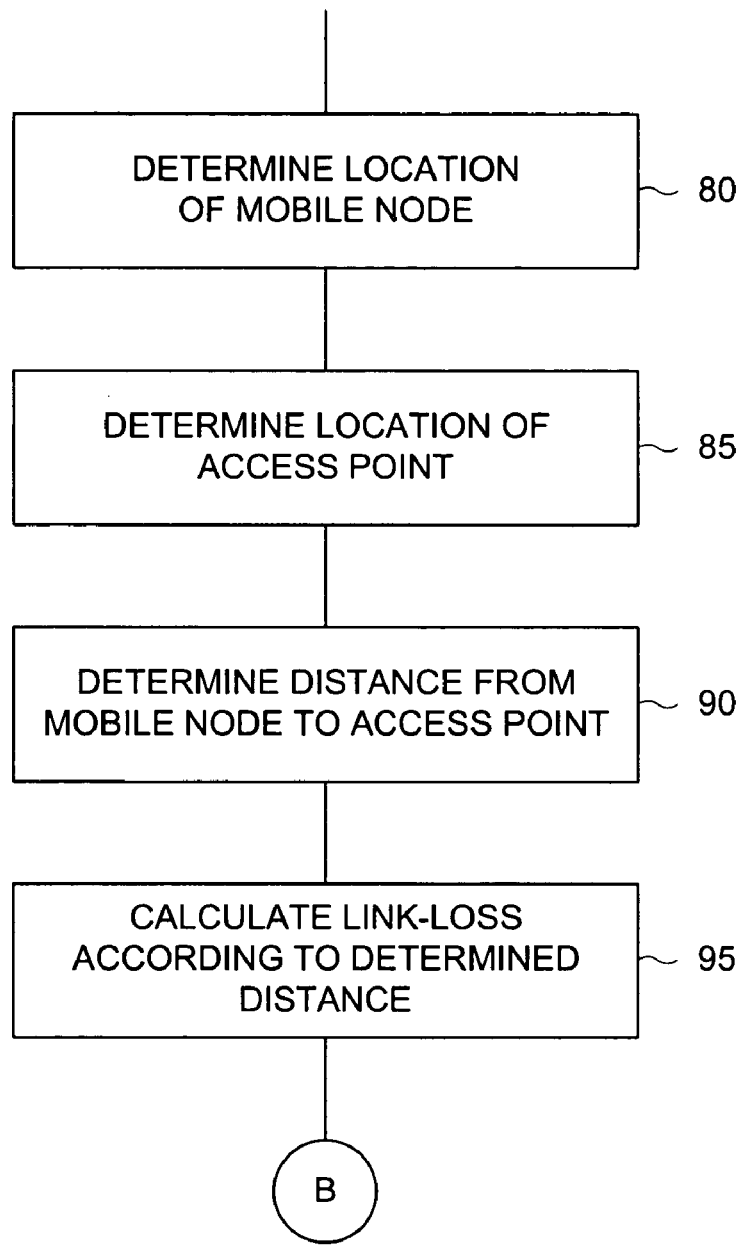
FIG. 5 is a flow diagram that depicts one example alternative method for estimating a link-loss.

FIG. 5 is a flow diagram that depicts one example alternative method for estimating a link-loss. According to this example alternative method, link-loss is estimated by determining a location of the mobile note (step 80). Once the location of the mobile node is determined, the location of a selected access point is then determined (step 85). The distance from the mobile node to the access point is then determined (step 90). This, according to yet another variation of the present method, is accomplished by a coordinate method where the coordinates of the mobile node and the coordinates of the selected access point are used to calculate a line-of-sight distance between the two sets of coordinates. The link-loss can then be calculated according to the determined distance (step 95). Calculation of the link-loss, according to yet another variation of the present method, is accomplished by using known attenuation tables for a particular transmission frequency that document empirical attenuation of a radiated signal as the signal travels through the atmosphere.

Figure 6:
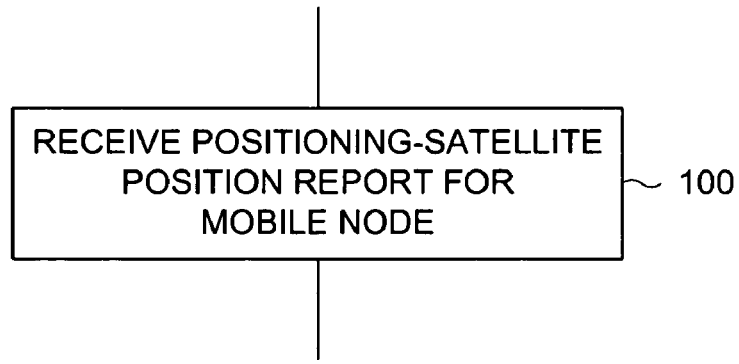
FIG. 6 is a flow diagram that depicts one alternative method for determining the position of a mobile node.

FIG. 6 is a flow diagram that depicts one alternative method for determining the position of a mobile node. According to this alternative method, the position of a mobile node is determined by receiving a position report from a satellite based positioning system (step 100). The location of the mobile node, according to one alternative variation of the present method, is determined by receiving a position report from a satellite positioning system. Examples of a satellite positioning system include, but are not limited to the Global Positioning System (GPS) and the Global Navigation Satellite System (GLONASS). The Wide Area Augmentation System (WAAS) system is an enhancement to the GPS system and can also be used to determine the position of a mobile node. Over time, yet other satellite-based systems will become available for determining the location of a mobile node and the scope of the claims appended hereto is not intended to be limited to any particular satellite-based positioning system herein described.

Figure 7:
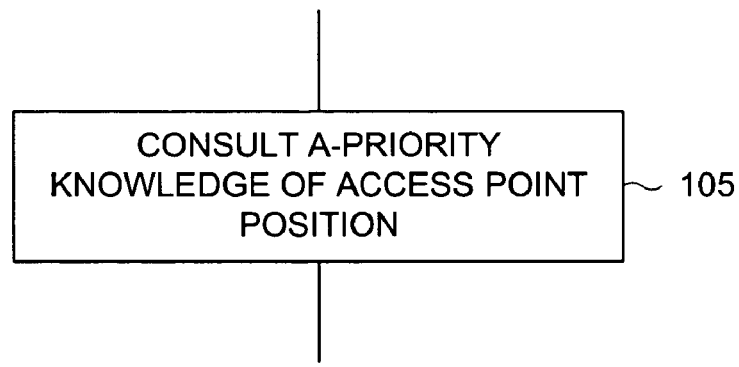
FIG. 7 is a flow diagram that depicts one alternative method for determining the location of an access point.

FIG. 7 is a flow diagram that depicts one alternative method for determining the location of an access point. According to this alternative method, the location of an access point is determined according to a priori knowledge (step 105). For example, one variation of the present method provides for consulting a table of known access points. This is accomplished by determining when the mobile node is proximate to a service region serviced by the access point.

Figure 8:
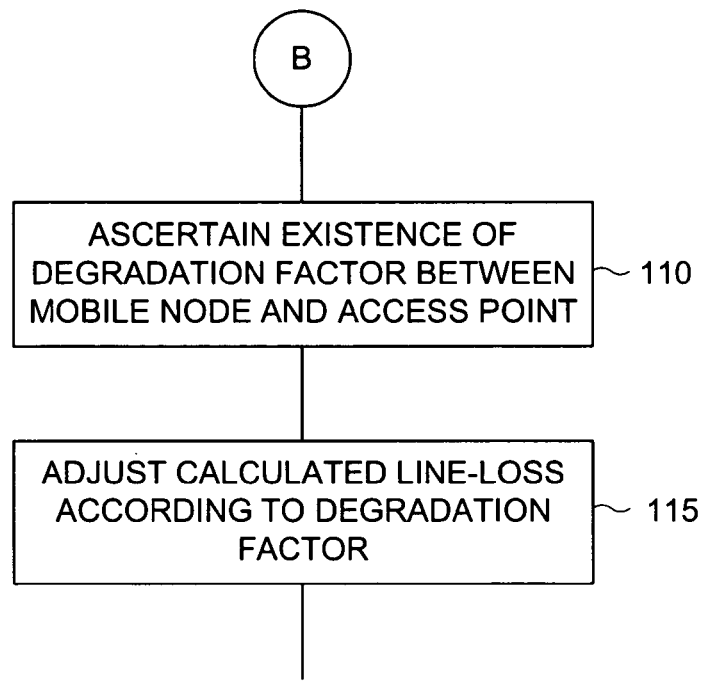
FIG. 8 is a flow diagram that depicts one alternative method for adjusting a link-loss estimate according to a degradation factor.

FIG. 8 is a flow diagram that depicts one alternative method for adjusting a link-loss estimate according to a degradation factor. According to this alternative method, the existence of a degradation factor is ascertained (step 110). The degradation factor must typically be situated between the mobile node and the access point. A degradation factor can include a physical obstacle such as a building. A degradation factor can also include a weather system. Other degradation factors can also be accommodated and the claims appended hereto are not intended to be limited in scope to any particular illustrative examples of degradation factors presented here. Once the existence of degradation factor is ascertained, any link-loss estimate determined according to a distance between the mobile node and the access point is adjusted (step 115) to reflect the existence of the degradation factor in the signal path.

Figure 9:
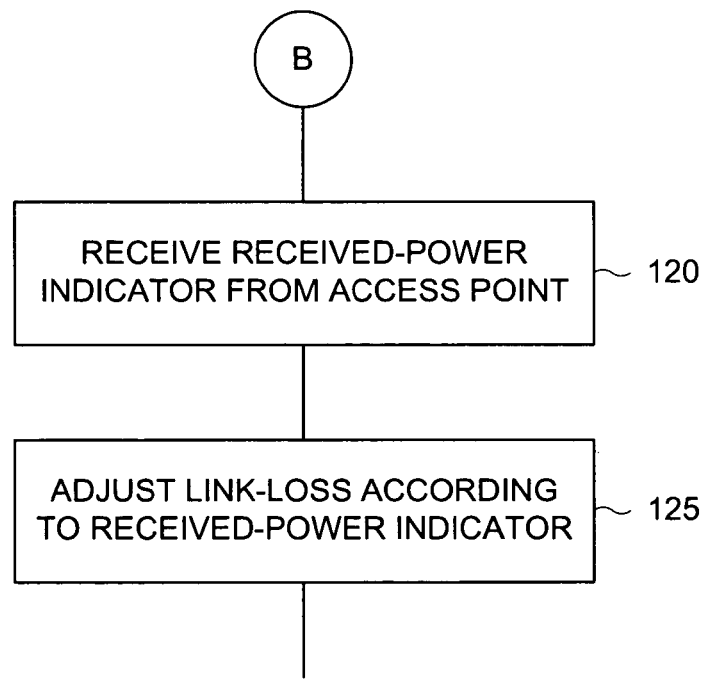
FIG. 9 is a flow diagram that depicts one illustrative alternative method for adjusting a link-loss estimate according to a feedback signal.

FIG. 9 is a flow diagram that depicts one illustrative alternative method for adjusting a link-loss estimate according to a feedback signal. According to this alternative variation of the present method, a link-loss estimate is adjusted (step 125) according to a received-power indicator that a mobile node received (step 120) from an access point. Once a mobile node has established an effective communications link with an access point, the access point typically directs a signal level indicator that reflects the signal level of a communications signal arriving at the access point from the mobile node. Accordingly, the link-loss estimate is adjusted so as to vary the amount of power arriving at the access point. Using this variation of the present method, the mobile node can adjust the amount of power that it radiates in accordance with power level directives issues by the access point.

Figure 10:
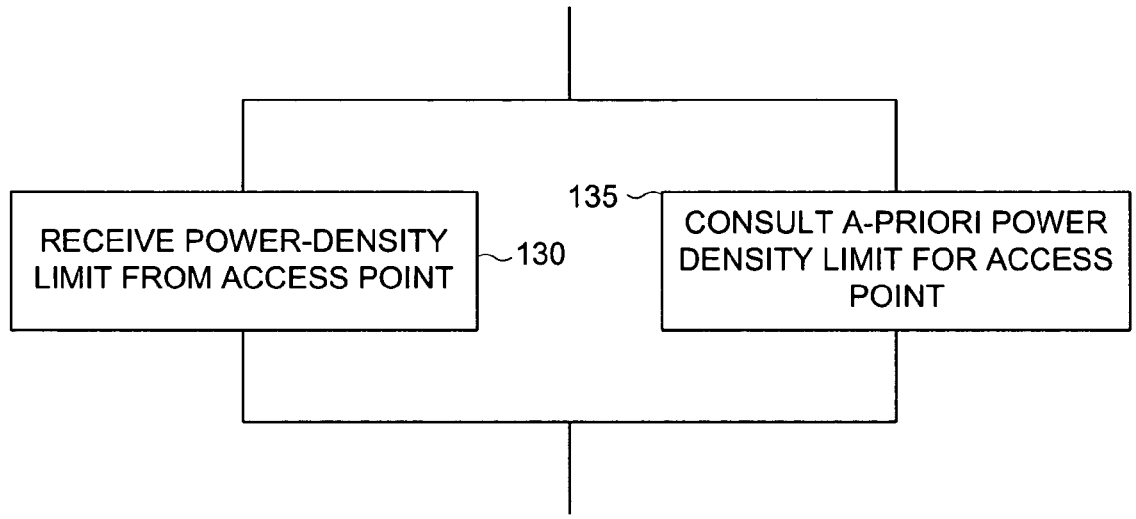
FIG. 10 is a flow diagram that depicts alternative methods for determining an allowable power density limit proximate to an access point.

FIG. 10 is a flow diagram that depicts alternative methods for determining an allowable power density limit proximate to an access point. According to one alternative method, an allowable (i.e. a maximum) power limit proximate to an access point is determined by receiving a power density limit directly from an access point (step 130). For example, a base station serving a particular cell in a cellular telephone system will broadcast a power-level indicator. As such, a mobile node (e.g. a cellular telephone) can then use the power-level indicator as a determined allowable maximum power density proximate to the access point. According to yet another alternative variation of the present method, an allowable maximum power density proximate to an access point is determined by consulting a priori knowledge (step 135). According to one variation of this alternative method, this is accomplished by consulting a table of known access points that includes an indicator that specifies an allowable power density for each of the known access points enumerated in the table.

Figure 11:
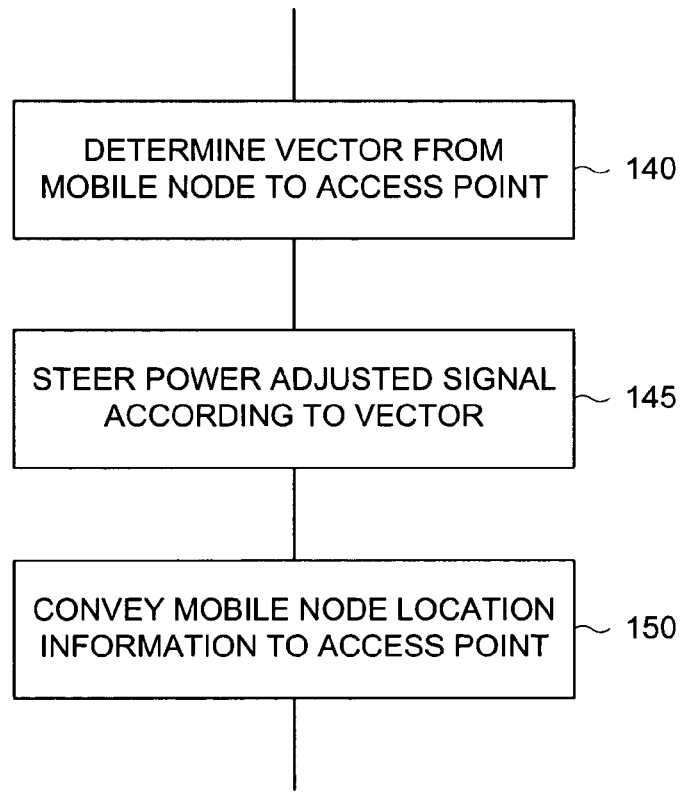
FIG. 11 is a flow diagram that depicts alternative methods for directing a signal to an access point.

FIG. 11 is a flow diagram that depicts alternative methods for directing a signal to an access point. According to one alternative example variation of the present method, a signal is directed to an access point by determining a vector from a mobile node to an access point (step 140). Accordingly, a vector from the mobile node to the access point is determined as a geometric vector from the location of the mobile node to the location of the access point. The location of the mobile node and the location of the access point are determined according to other variations of the present method heretofore described. Once a vector from the mobile node to the access point is determined, a power adjusted signal is directed to the mobile node according to the determined vector (step 145). In yet another variation of the present method, the location of the mobile node is conveyed to the access point. When an access point receives the location of a mobile node, it can use this information to steer an antenna toward the mobile node. By steering an antenna to the mobile node, the mobile node may be able to reduce the amount of power that it needs to direct toward the access point. It should be noted that other variations of the present method are contemplated wherein the estimate of a link-loss between the mobile node and the access point is adjusted to reflect the fact that the access point is using a directional antenna (i.e. the access point antenna introduces a gain factor into the link analysis).

Figure 12:
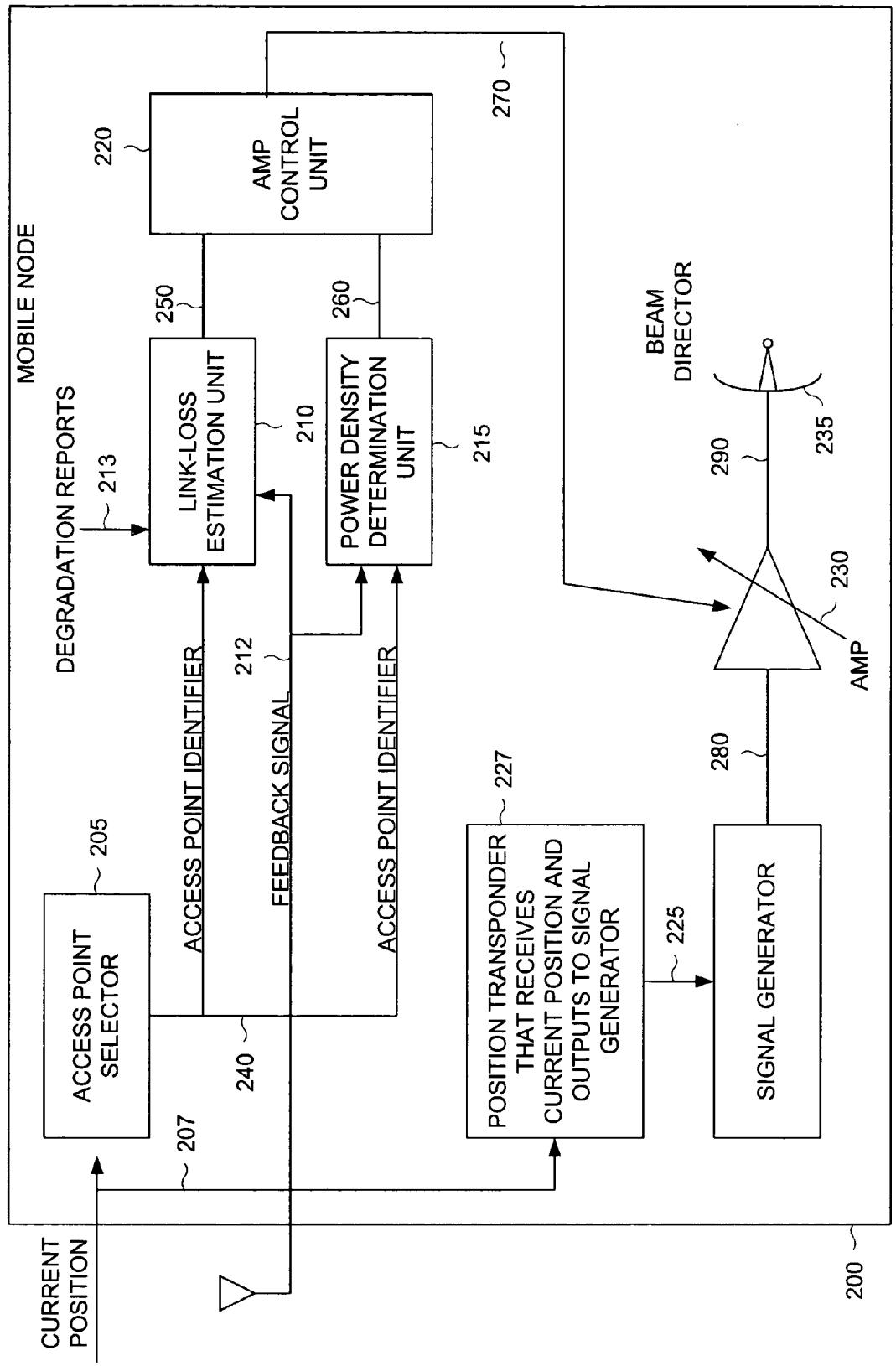
FIG. 12 is a block diagram of one example embodiment of a mobile nod.

FIG. 12 is a block diagram of one example embodiment of a mobile node. According to this example embodiment, a mobile node 200 comprises an access point selector 205, a link-loss estimation unit 210, a power density determination unit 215, an amplifier control unit 220, a signal generator 225, an amplifier 230 and a beam director 235. In the simplest embodiment, the beam director comprises an omni-directional antenna.

According to this example embodiment, the access point selector generates an access point identifier 240 for a selected access point. Typically, the access point selector 205 selects an access point according to a current position 207 of the mobile node 200. The link-loss estimation unit 210 generates a link-loss signal 250 according to an access identifier 240 that it receives from the access point selector 205. The link-loss signal is a logarithmic representation of the signal path attenuation between the mobile node 200 and an access point. The access point identifier 240 is also received by the power density determination unit 215. The power density determination unit 215 generates a maximum power density signal 260 for an access point identified by the access point identifier 240. The maximum power density signal 260 is a logarithmic representation of the maximum allowable power density proximate to an access point identified by the access point identifier 240.

In this example embodiment, the link-loss signal 250 and the maximum power density signal 260 are directed to the amplifier control unit 220. The amplifier control unit 220 then generates an amplifier control signal 270 according to the link-loss signal 250 and the maximum power density signal 260. According to one alternative embodiment, the amplifier control unit 220 sums the logarithmic signals received from the link-loss estimation unit 210 and the power density determination unit 215 in order to generate the amplifier control signal 270. It should be appreciated that the amplifier control unit 220 will introduce an offset into the amplifier control signal 270 before applying an anti-log function to produce the actual amplifier control signal 270. The offset is applied to ensure that the amplifier 230 properly adjusts the power of a radiated signal.

The signal generator 225 of this example embodiment generates a communications signal 280 that is suitable for interacting with a communications system. The signal generator 280, according to one alternative embodiment, comprises a cellular telephone signal generator capable of generating a signal for interacting with a cellular telephone system. According to yet another alternative embodiment, the signal generator 280 comprises a wireless networking signal generator capable of generating a signal suitable for interacting with a wireless network. According to one alternative example embodiment, the wireless networking signal generator comprises an 801.11 signal generator. The amplifier 230 adjusts the power level of the communications signal 280 according to the amplifier control signal 270 generated by the amplifier control unit 220. The power adjusted signal 290 is conveyed to the beam director 235, which radiates the power adjusted into free-space, presumably toward an access point.

Figure 13:
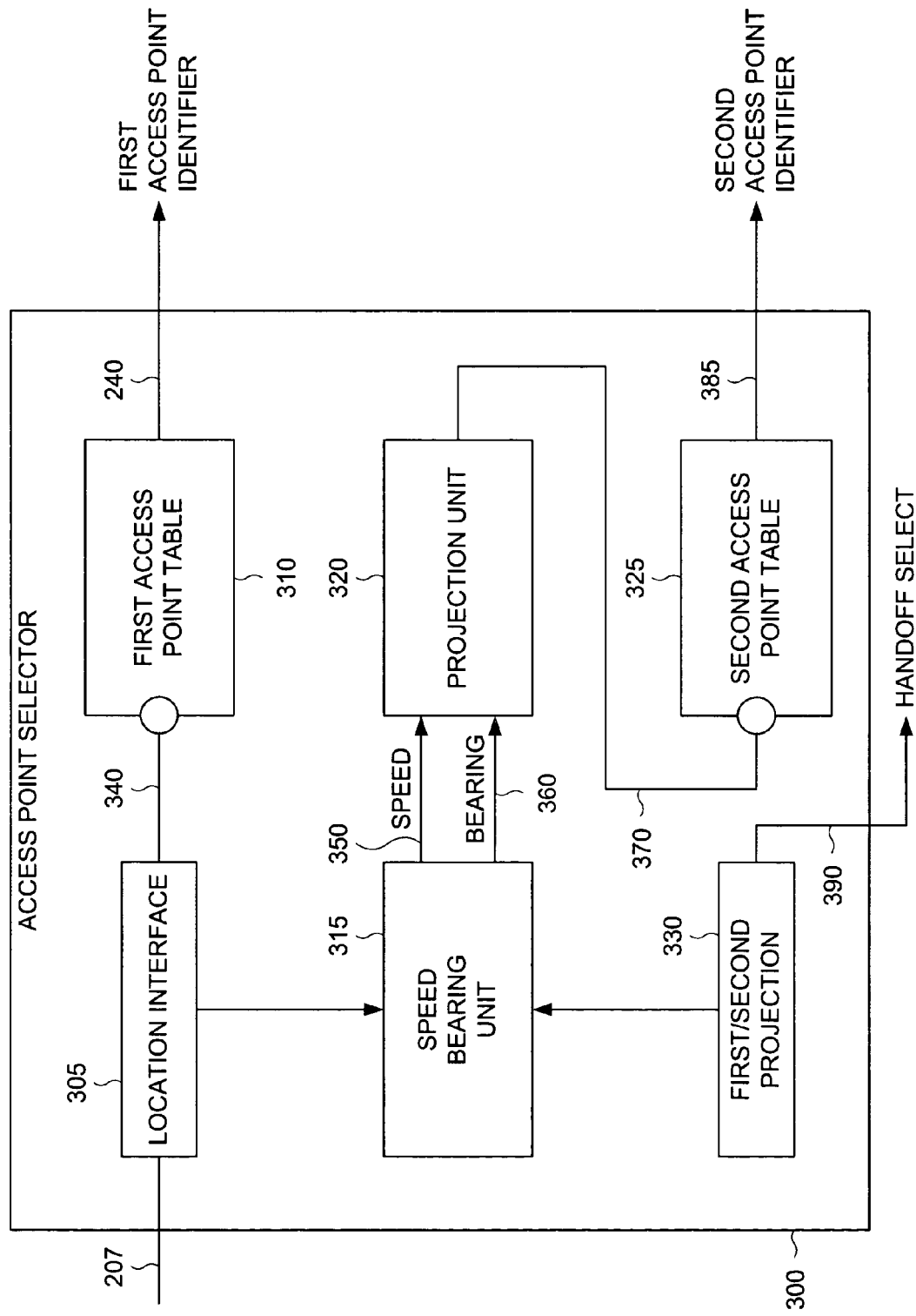
FIG. 13 is a block diagram that depicts several alternative embodiments of an access point selector.

FIG. 13 is a block diagram that depicts several alternative embodiments of an access point selector. According to one alternative example embodiment, an access point selector 300 comprises a location interface 305. The location interface 305 receives a current location 207 for a mobile node. According to one alternative embodiment, the location interface receives a location 207 in the form of a satellite positioning report. A satellite positioning reports can be received from at least one of a GPS receiver, a GLONASS receiver and a WAAS receiver.

The access point selector 300 of this alternative example embodiment further comprises an access point table 310. The access point table 310 is capable of storing the locations of a plurality of access points. These locations are typically represented by a center point and a radius to reflect a service region supported by an access point. The current location of the mobile node 340 is used to select an access point. The selection is represented by an access point identifier 240.

According to one yet another alternative embodiment, an access point selector 300 further comprises a speed and bearing unit 315. The speed and bearing unit generates a speed indicator 350 and a bearing indicator according to two or more successive position reports received from the location interface 305. Typically, the speed and bearing unit 315 determines speed according to the distance represented by two successive position reports received over some period of time using a classic speed equals distance divided by time relationship.

This alternative embodiment of an access point selector further comprises a projection unit 320 that receives the speed indicator 350 and the bearing indicator 360 and determines a first future location of the mobile node at a prescribed point in the future as the mobile node travels along a travel path. For example, where the mobile node 300 is embodied in an aircraft, the first future location will be along an flight path represented by the bearing indicator and the location will be determined according to the speed indicator by projecting the speed along the flight path to a prescribed time in the future, e.g. 15 minutes. The first projected location is then directed to the first access point table in order to identify a first access point.

According to yet another alternative embodiment, the speed and bearing unit 315 is directed to generate a second projection resulting in a second future location for the mobile node. The speed and bearing unit 315 is directed to generate a second projection by a first/second projection selection unit 330 included in this alternative example embodiment of an access point selector. Substantially contemporaneously with the projection of a second future location for the mobile node 300, the first/second projection selection unit 330 generates a hand-off signal 390. The handoff signal can be used to direct hand-off information to a second selected access point. The second selected access point is identified by a second access point indicator 385 generated by a second access point table 325 included in this alternative embodiment of an access point selector 300.

Figure 14:
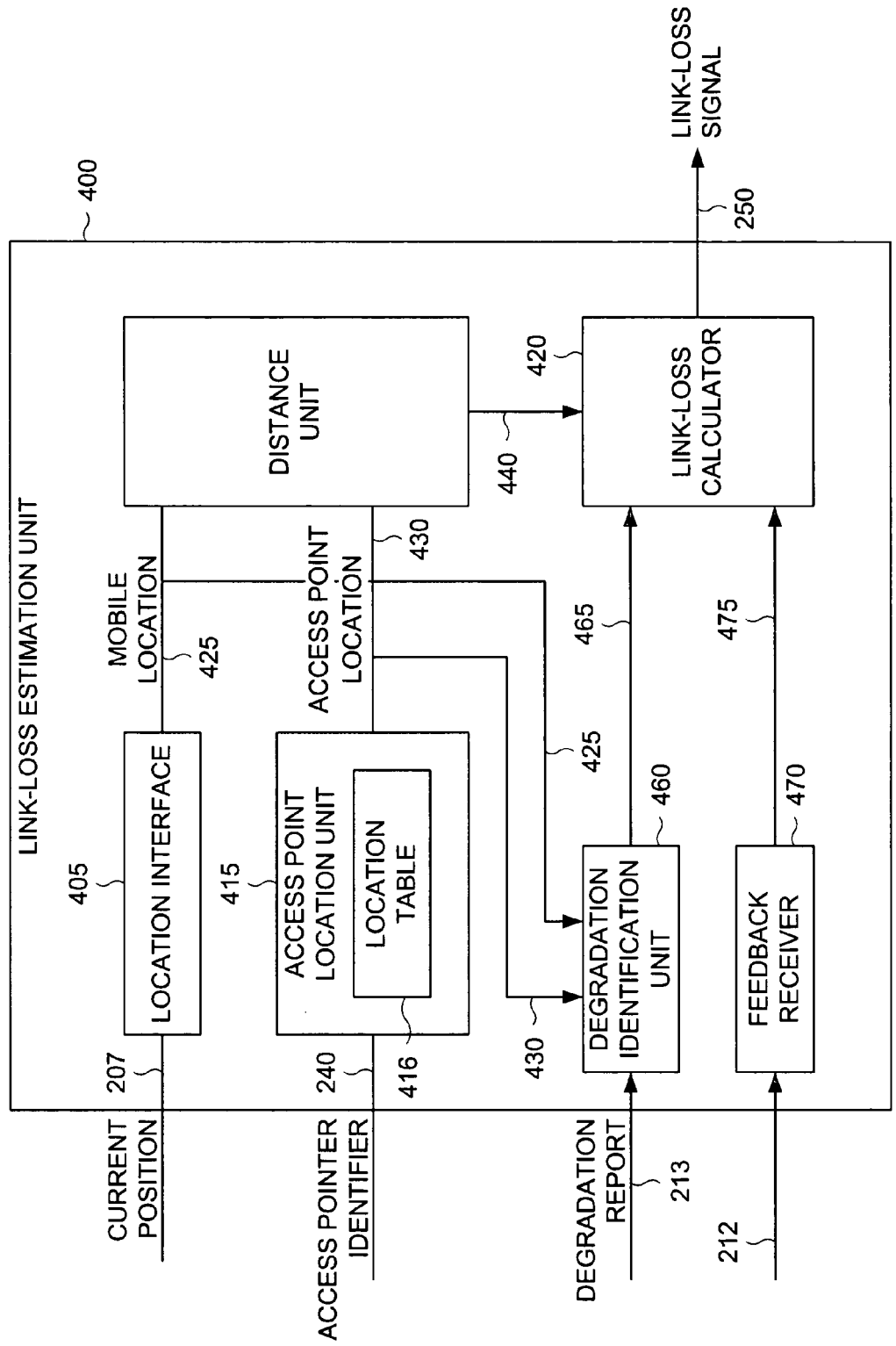
FIG. 14 is a block diagram that depicts several alternative example embodiments of a link-loss estimation unit.

FIG. 14 is a block diagram that depicts several alternative example embodiments of a link-loss estimation unit. According to one example embodiment, a link-loss estimation unit 400 comprises a mobile node location interface 405, an access point location unit 415, a distance unit 410 and a link-loss calculator 420. The mobile node location interface 405 receives an indication of the current position 207 for the mobile node 200. According to one alternative illustrative embodiment, the mobile node location interface 405 receives an indicator of current position in the form of a positioning-satellite position report. This satellite position report can be received from a number of sources including, but not limited to a GPS receiver, a GLONASS receiver and a WAAS receiver. The claims appended hereto are not intended to be limited in scope to any particular embodiment fashioned to accept a position report from any of the heretofore introduced satellite positioning systems. Rather, the scope of the claims appended hereto is intended to include all types of position reports that may be received from various types of positioning receivers either satellite or terrestrial or both.

According to this example embodiment of a link-loss estimation unit 400, the access point location unit 415 comprises a location table 416. The location table 416 is capable of storing a priori location information for a plurality of access points. An entry in the location table 416 is selected according to an access point identifier 240 received from the access point selector 205.

The mobile node location interface 405 and the access point location unit 415 generate a mobile node location indicator 425 and an access point location indicator 430, respectively. The mobile mode location indicator 425 and the access point location indicator 430 are directed to the distance unit 410 included in this illustrative embodiment of a link-loss estimation unit 400. The distance unit 410 performs a geometric calculation resulting in a distance signal 440. The distance signal 440 is then directed to the link-loss calculator 420.

The link-loss calculator 420 of one alternative embodiment generates a link-loss signal 250 according to the distance signal 440. The link-loss calculator generates the link-loss signal 250 by applying an attenuation factor that represents the attenuation that a signal a particular frequency will experience as it propagates through free-space. The link-loss calculator 420 to yet another alternative embodiment converts the link-loss signal 250 into a logarithmic representation of the attenuation factor.

FIG. 14 further illustrates that, according to yet another alternative illustrative embodiment, a link-loss estimation unit 400 further comprises a degradation identification unit 460. The degradation identification unit 460 receives the mobile node location indicator 425 generated by mobile mode location interface 405 and the access point location indicator 425 generated by mobile mode location interface 405 and the access point location indicator 430 generated by the access point location unit 415. The degradation identification unit 460 performs a geometric calculation to determine a line-of sight vector from the mobile node 200 to an access point. The degradation identification unit 460 receives a degradation factor report 213. The degradation factor report 213, according to one alternative embodiment, includes, but is not limited to at least an obstacle report and a weather anomaly report. A weather anomaly report can describe several different types of weather phenomenon including, but not limited to clouds, rain and thunder cells. When the degradation identification unit 460 receives a degradation factor report 213, the degradation identification unit 460 determines if the degradation factor report 213 describes a degradation factor that lies substantially along the line-of-sight vector, the degradation factor report 213 is propagated 465 to link-loss calculator 420. The link-loss calculator 420 then adjusts the link-loss signal 250 to reflect the degradation factor described in the degradation factor report 213 received by the degradation identification unit 460. The degradation identification unit 460 generates a logarithmic representation of an attenuation factor that a signal at a particular frequency will experience as it passes through the degradation factor.

According to yet another illustrative example embodiment, the link-loss estimation unit 400 further comprises a feedback receiver 470. The feedback receiver 470 receives a feedback signal 212. Typically, the feedback signal 212 is received from an access point. In operation, an access point will perceive a signal radiated by the mobile node 200. The access point measures the signal level of the signal it receives from the mobile node. The access point then includes a signal level indicator in the feedback signal 212 received by the mobile node 200. Accordingly, the feedback receiver 470 converts the signal level indicator into an offset factor 475. The offset factor 475 is used by the link-loss calculator 420 to adjust the link-loss signal 250. In this manner, the link-loss calculator 420 forces an adjustment in the amount of power radiated by the mobile load 200 toward the access point in a substantially closed-feedback manner.

Figure 15:
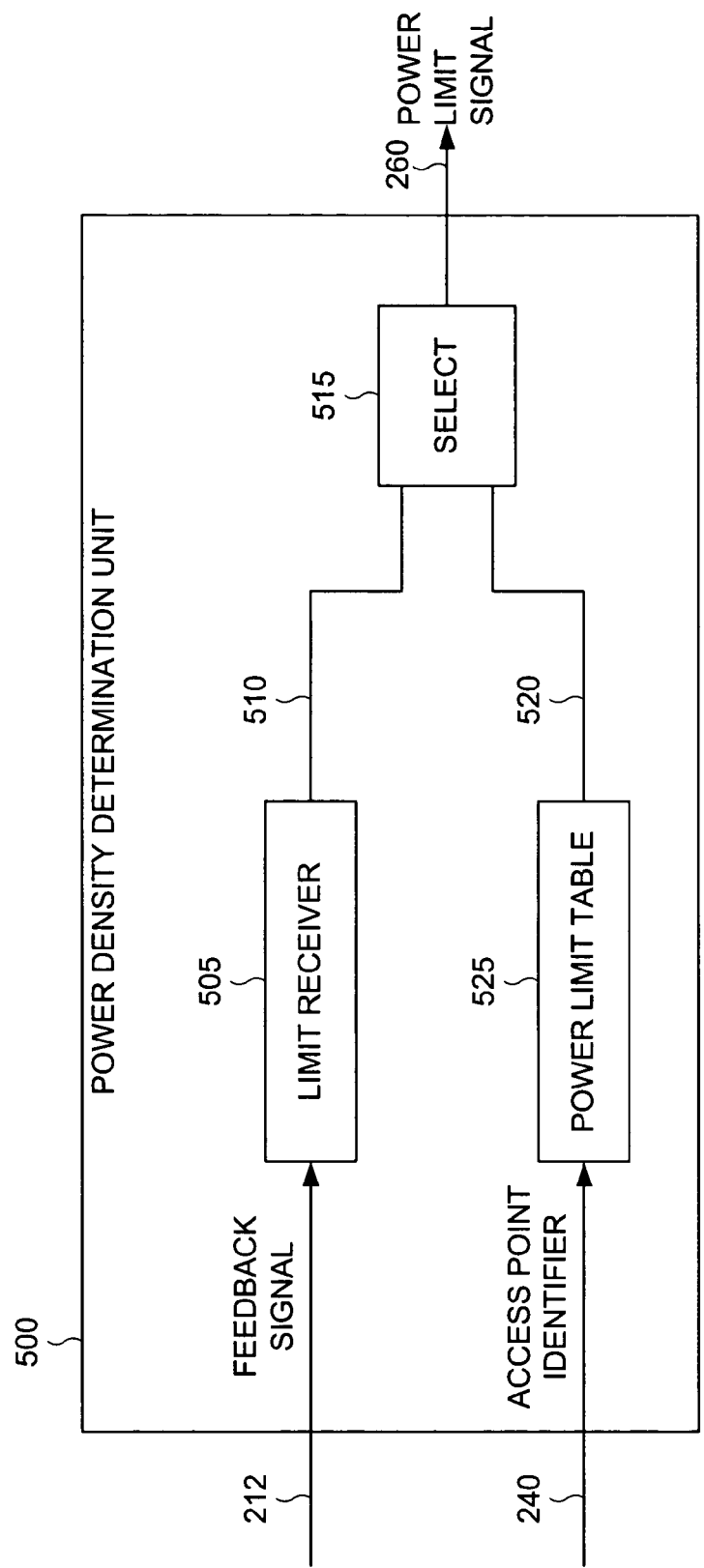
FIG. 15 is a block diagram that depicts several alternative embodiments of a power density determination unit.

FIG. 15 is a block diagram that depicts several alternative embodiments of a power density determination unit 500. According to one alternative illustrative embodiment, the power density determination unit 500 comprises a power-density limit receiver 505. The power-density limit receiver 505 receives a feedback signal 212. In operation, an access point includes the maximum allowable power-density indicator into the feedback signal 212. The power-density limit receiver 505 extracts the power-density indicator from the feedback signal 212. The power-density indicator 510 according to one alternative embodiment is provided as a power limit signal 260. An optional element included in the power density determination unit 500 is a selector 515. The selector 515 comprises at least one input for receiving the power-density indicator 510 from the power-density limit receiver 505. According to one alternative embodiment, the selector 515 converts the power-density limit indicator into a logarithmic representation of a maximum allowable power-density proximate to an access point.

According to yet another illustrative embodiment, the power density determination unit 500 includes a power limit table 525. The power limit table 525 is capable of storing a priori values of maximum allowable power density for a plurality of access points. An allowable power density limit is selected according to an access point identifier 240 received from the access point selector 205 included in the mobile node 200. Typically, a value stored in the power limit table 525 is expressed as a logarithmic representation of a maximum allowable power density proximate to an access point. The value 520 provided by the power limit table 525 is directed to the selector 515. The selector 515 generates a power limit signal 260 according to the value 520 it receives from the power limit table 525.

It should be noted that various alternative embodiments will include only one of the limit receiver 505 and the power limit table 525. In this case, the selector 515 is not required. The selector 515 is only required in an embodiment that includes both the power density limit receiver 505 and the power limit table 525.

Figure 16:
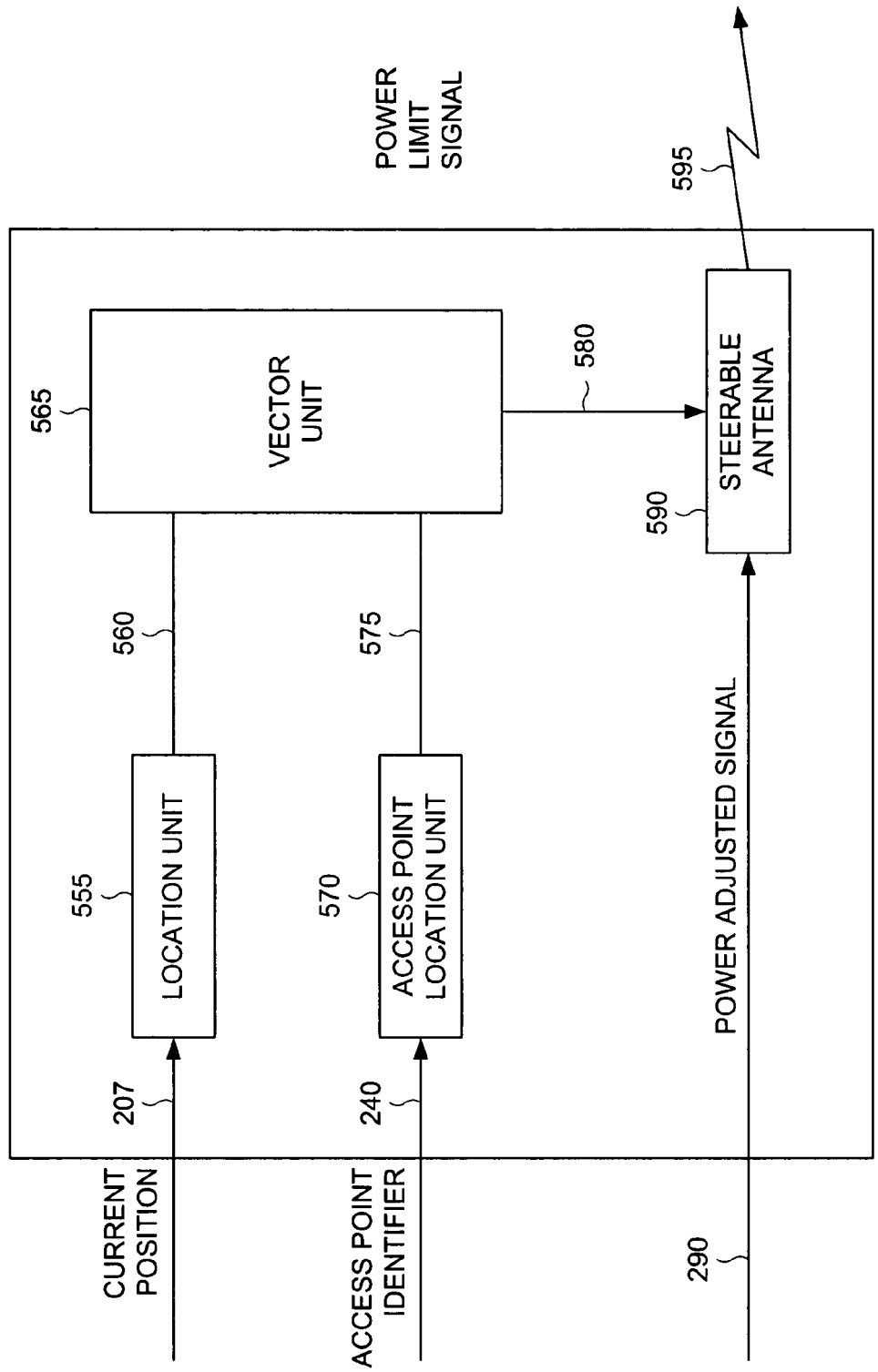
FIG. 16 is a block diagram that depicts one example embodiment of a beam director.

FIG. 16 is a block diagram that depicts one example embodiment of a beam director. According to this example embodiment, a beam director 235 comprises a mobile mode location interface 555 and an access point location unit 570. The mobile mode location interface 555 receives a current position 207 for the mobile node. The current position 207 can be received from various sources. For example, the current position 270 can be received from a satellite positioning system as herein described. The access point location unit 570 is table based and is capable of storing location indicators for a plurality of access points. The mobile node location unit 555 generates a mobile node location indicator 560 according to a current position 207 for the mobile load. The access point location unit 570 selects a value from the table according to an access point identifier 240 received from the access point selector 205. The selected value comprises an access point location indicator 575.

The mobile mode location indicator 560 and the access point location indicator 575 are directed to a vector unit 565 included in this alternative embodiment of a beam director 235. The vector unit 565 generates a vector signal 580. The vector signal 580 represents a line-of-sight vector from the mobile node to an access point.

The vector signal 580 is directed to a steerable antenna 590 included in this example embodiment of a beam director 550. The steerable antenna 590 receives a power adjusted signal 290 from the amplifier 230. The steerable antenna 590 radiates 595 the power adjust signal 290 into free space in a direction substantially in accord with the vector signal 580 generated by the vector unit 565.

FIG. 12 further illustrates that, according to one alternative embodiment, a mobile node 200 further includes a position transponder 227. The position transponder 227 receives a current position 207 for the mobile node 200. The current position 207 is directed as a current position indicator to the signal generator 225. The signal generator 225 incorporates the current position indicator into the signal that the signal generator 225 generates and which is suitable for interacting with a communications system.

While the present method and apparatus has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A method for interacting with a communications system from a mobile node, the method comprising:
   identifying an access point included in the communications system;
   estimating a link-loss from the mobile node to the access point;
   determining a power density limit proximate to the access point;
   generating a communications signal for interacting with the communications system;
   adjusting the power of the communications signal according to the power density limit and further according to the estimated link-loss; and
   directing the power adjusted communications signal to the access point;
   wherein estimating a link-loss comprises:
   determining the location of the mobile node;
   determining the location of the access point;
   determining the distance from the mobile node to the access point according to the determined location of the mobile node and the determined location of the access point; and
   calculating the link-loss according to the determined distance.

2. The method of claim 1 wherein identifying an access point comprises:
   determining the location of the mobile node; and
   selecting an access point from an enumeration of known access points according to the location of the mobile node.

3. The method of claim 1 further comprising:
   wherein the link loss is calculated in accordance with a degradation report including degradation factor associated with an obstruction, wherein the obstruction includes a building or a weather system.

4. The method of claim 1 wherein determining a power density limit proximate to the access point comprises at least one of receiving a power density limit indicator from the access point and consulting an a priori power density limit for the access point.

5. A method for interacting with a communications system from a mobile node, the method comprising:
   identifying an access point included in the communications system;
   estimating a link-loss from the mobile node to the access point,
   determining a power density limit proximate to the access point;
   generating a communications signal for interacting with the communications system;
   adjusting the power of the communications signal according to the power density limit and further according to the estimated link-loss; and
   directing the power adjusted communications signal to the access point wherein identifying an access point comprises:
   determining a current location of the mobile node;
   determining the speed and bearing of the mobile node;
   projecting a first future location of the mobile node according to the speed and bearing; and
   selecting a first access point from an enumeration of known access points according to the projected first future location of the mobile node.

6. The method of claim 5 further comprising:
   projecting a second future location of the mobile node according to the speed and bearing;
   selecting a second access point from an enumeration of known access points according to the second projected future location of the mobile node; and
   conveying hand-off information to the second selected access point.

7. The method of claim 5 wherein estimating a link-loss comprises:
  determining the distance from the mobile node to the access point according to the determined location of the mobile node and the determined location of the access point; and
  calculating the link-loss according to the determined distance.

8. The method of claim 7 wherein determining the location of the mobile node comprises receiving a positioning-satellite position report.

9. The method of claim 7 wherein determining the location of the access point comprises consulting a-priori knowledge pertaining to the position of the access point.

10. The method of claim 7 further comprising:
  receiving a received power indicator from the access point; and
  adjusting the calculated link-loss according to the received power indicator.

11. The method of claim 5 wherein directing the communications signal to the access point comprises:
  determining a vector from the mobile node to the access point; and
  steering the power adjusted communications signal according to the vector.

12. The method of claim 11 further comprising conveying mobile node location information to the access point.

13. A mobile node comprising:
  access point selector capable of generating an access point identifier that represents a selected access point;
  link-loss estimation unit capable of accepting the access point identifier and further capable of generating a link-loss signal that represents an estimate of link-loss between the mobile node and a selected access point,
  power density determination unit capable of generating a maximum power density signal according to the access point identifier;
  amplifier control unit capable of generating an amplifier control signal according to the link-loss signal and according to the maximum power density signal;
  signal generator capable of generating a communications signal for interacting with an access point;
  amplifier capable of adjusting the level of the communications signal according to the amplifier control signal;
  beam director capable of directing the level adjusted communications signal to an access point, wherein the link-loss estimation unit receives a mobile node location indicator;
  wherein the link-loss estimation unit receives an access point location indicator according to an access point identifier received from the access point selector;
  wherein the link loss estimation unit generates a distance signal according to the mobile node location indicator and the access point location indicator, and calculates the link-loss signal according to the distance signal.

14. The mobile node of claim 13 wherein the access point selector comprises:
  location interface capable of receiving a location indicator representative of a current location of the mobile node; and
  access point table capable of providing an identifier for an access point according to a received current mobile node location indicator.

15. The mobile node of claim 13 wherein the link-loss estimation unit further comprises a degradation identification unit capable of receiving a degradation factor report and selecting the degradation factor report according to a mobile node location indicator.

16. The mobile node of claim 13 wherein the power density determination unit comprises at least one of a power density limit receiver that is capable of generating a power density limit signal according to a received power-density limit indicator and a power-density limit table that is capable of storing a priori values of maximum power density for a plurality of access points and is further capable of generating a power density limit signal according to a value stored in the table and further according to an access point identifier received from the access point selector.

17. The mobile node of claim 13 wherein the beam director comprises:
  mobile node location interface capable of receiving a mobile node location indicator;
  access point location unit capable of generating an access point location indicator according to an access point identifier received from the access point selector;
  vector unit capable of generating a vector signal according to the mobile node location indicator and the access point location indicator; and
  steerable antenna capable of directing the level adjusted signal according to the vector signal.

18. The mobile node of claim 13 further comprising a position transponder capable of conveying the location of a location for the mobile node to an access point.

19. A mobile node, comprising:
  an access point selector capable of generating an access point identifier that represents a selected access point;
  a link-loss estimation unit capable of accepting the access point identifier and further capable of generating a link-loss signal representing an estimate of link-loss between the mobile node and a selected access point;
  a power density determination unit capable of generating a maximum power density signal according to the access point identifier;
  an amplifier control unit capable of generating an amplifier control signal according to the link-loss signal and according to the maximum power density signal;
  a signal generator capable of generating a communications signal for interacting with an access point;
  an amplifier capable of adjusting the level of the communications signal according to the amplifier control signal;
  beam director capable of directing the level adjusted communications signal to an access point;
  wherein the access point selector comprises:
  location interface capable of receiving a location indicator representative of a current location of the mobile node;
  speed and bearing unit capable of generating a speed indicator and a bearing indicator for the mobile node according to two or more received current mobile node location indicators;
  projection unit capable of generating a first future location indicator for the mobile node according to the speed and bearing indicators; and
  access point table capable of generating a location indicator for an access point according to the first future location indicator.

20. The mobile node of claim 19 wherein the projection unit is further capable of generating a second future location indicator for the mobile node according to the speed and bearing indicators and wherein the access point table is further capable of generating a location indicator for an access point according to the second future location indicator.

21. The mobile node of claim 19 wherein the link-loss estimation unit comprises:

mobile node location interface capable of receiving a mobile node location indicator;

access point location unit capable of generating an access point location indicator according to an access point identifier received from the access point selector;

distance unit capable of generating a distance signal according to the mobile node location indicator and the access point location indicator; and link-loss calculator capable of generating the link-loss signal according to the distance signal.

22. The mobile node of claim 21 wherein the mobile node position interface is capable of receiving a mobile node location indicator in the form of a positioning-satellite position report.

23. The mobile node of claim 21 wherein the access point location unit includes an access point table that is capable of storing a priori location indicators for a plurality of access points.

24. The mobile node of claim 21 further comprising a feedback receiver capable of receiving a received-power indicator and wherein the link-loss calculator is further capable of adjusting the link-loss signal according to the received-power indicator.

* * * * *